(12) United States Patent
Vokaliga et al.

(10) Patent No.: US 11,315,028 B2
(45) Date of Patent: Apr. 26, 2022

(54) METHOD AND APPARATUS FOR INCREASING THE ACCURACY OF PREDICTING FUTURE IO OPERATIONS ON A STORAGE SYSTEM

(71) Applicant: EMC IP HOLDING COMPANY LLC, Hopkinton, MA (US)

(72) Inventors: Deepak Vokaliga, Hopkinton, MA (US); Rong Yu, West Roxbury, MA (US)

(73) Assignee: Dell Products, L.P., Hopkinton, MA (US)

( * ) Notice: Subject to any disclaimer, the term of this patent is extended or adjusted under 35 U.S.C. 154(b) by 0 days.

(21) Appl. No.: 17/010,945

(22) Filed: Sep. 3, 2020

(65) Prior Publication Data

US 2022/0067549 A1    Mar. 3, 2022

(51) Int. Cl.
*G06F 12/00* (2006.01)
*G06F 13/00* (2006.01)
*G06N 5/04* (2006.01)
*G06F 3/06* (2006.01)

(52) U.S. Cl.
CPC ............ *G06N 5/04* (2013.01); *G06F 3/0604* (2013.01); *G06F 3/067* (2013.01); *G06F 3/0647* (2013.01); *G06F 3/0659* (2013.01)

(58) Field of Classification Search
CPC .... G06F 3/0604; G06F 3/0647; G06F 3/0659; G06F 3/06047; G06N 5/04
USPC ........................................................ 711/154
See application file for complete search history.

(56) References Cited

U.S. PATENT DOCUMENTS

| | | | | |
|---|---|---|---|---|
| 9,246,996 | B1* | 1/2016 | Brooker | H04L 67/1008 |
| 9,503,517 | B1* | 11/2016 | Brooker | H04L 67/1097 |
| 9,804,993 | B1* | 10/2017 | Brooker | G06F 11/008 |
| 9,823,840 | B1* | 11/2017 | Brooker | G06F 3/0604 |
| 9,946,569 | B1* | 4/2018 | Beedu | G06F 9/45558 |
| 9,965,216 | B1* | 5/2018 | Jaganathan | G06F 11/1458 |
| 10,140,039 | B1* | 11/2018 | Baruch | G06F 11/1471 |
| 10,250,679 | B1* | 4/2019 | Natanzon | G06F 3/067 |
| 10,261,717 | B1* | 4/2019 | Martin | G06F 3/0685 |
| 10,496,601 | B1* | 12/2019 | Natanzon | G06F 3/0685 |
| 10,776,317 | B1* | 9/2020 | Veeraswamy | G06F 3/0604 |
| 10,911,540 | B1* | 2/2021 | Gunasekaran | G06F 3/0632 |
| 2012/0124285 | A1* | 5/2012 | Soran | G06F 3/0665 |
| | | | | 711/114 |

(Continued)

*Primary Examiner* — Sheng Jen Tsai
(74) *Attorney, Agent, or Firm* — Anderson Gorecki LLP

(57) ABSTRACT

A method of increasing the accuracy of predicting future IO operations on a storage system includes creating a snapshot of a production volume, linking the snapshot to a thin device, mounting the thin device in a cloud tethering subsystem, and tagging the thin device to identify the thin device as being used by the cloud tethering subsystem. When data read operations are issued by the cloud tethering subsystem on the tagged thin device, the data read operations are executed by a front-end adapter of the storage system to forward data associated with the data read operations to a cloud repository. The cache manager, however, does not use information about data read operations on tagged thin devices in connection with predicting future IO operations on the cache, so that movement of snapshots to the cloud repository do not skew the algorithms being used by the cache manager to perform cache management.

13 Claims, 7 Drawing Sheets

(56) References Cited

U.S. PATENT DOCUMENTS

| | | | |
|---|---|---|---|
| 2013/0080728 A1* | 3/2013 | Cashman | G06F 3/0665 |
| | | | 711/170 |
| 2014/0236898 A1* | 8/2014 | Hankins | G06F 3/0689 |
| | | | 707/639 |
| 2017/0161286 A1* | 6/2017 | Eda | G06F 3/0685 |
| 2017/0329552 A1* | 11/2017 | Baldwin | G06F 3/0649 |
| 2017/0351615 A1* | 12/2017 | Agombar | G06F 12/0831 |
| 2018/0081548 A1* | 3/2018 | Barzik | G06F 3/067 |
| 2018/0129443 A1* | 5/2018 | Karve | G06F 3/0611 |
| 2019/0317682 A1* | 10/2019 | Li | G06F 3/0632 |
| 2019/0340292 A1* | 11/2019 | Chandrashekhara | |
| | | | G06F 12/0875 |
| 2021/0081432 A1* | 3/2021 | Grunwald | G06F 16/2379 |
| 2021/0133098 A1* | 5/2021 | Wilson | G06F 12/0253 |
| 2021/0133115 A1* | 5/2021 | Wilson | G06F 12/122 |
| 2021/0240657 A1* | 8/2021 | Kumar | G06F 16/137 |

\* cited by examiner

METHOD AND APPARATUS FOR INCREASING THE ACCURACY OF PREDICTING FUTURE IO OPERATIONS ON A STORAGE SYSTEM

FIELD

This disclosure relates to computing systems and related devices and methods, and, more particularly, to a method and apparatus for increasing the accuracy of predicting future IO operations on a storage system.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

A method of increasing the accuracy of predicting future IO operations on a storage system includes creating a snapshot of a production volume, linking the snapshot to a thin device, mounting the thin device in a cloud tethering subsystem, and tagging the thin device to identify the thin device as being used by the cloud tethering subsystem. When data read operations are issued by the cloud tethering subsystem on the tagged thin device, the data read operations are executed by a front-end adapter of the storage system to forward data associated with the data read operations to a cloud repository. The cache manager, however, does not use information about data read operations on tagged thin devices in connection with predicting future IO operations on the cache, so that movement of snapshots to the cloud repository do not skew the algorithms being used by the cache manager to perform cache management. Likewise, the compression subsystem does not include data associated with read operations on tagged thin devices in the uncompressed data pool, to prevent movement of snapshots to a cloud repository from consuming space in the uncompressed data pool.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
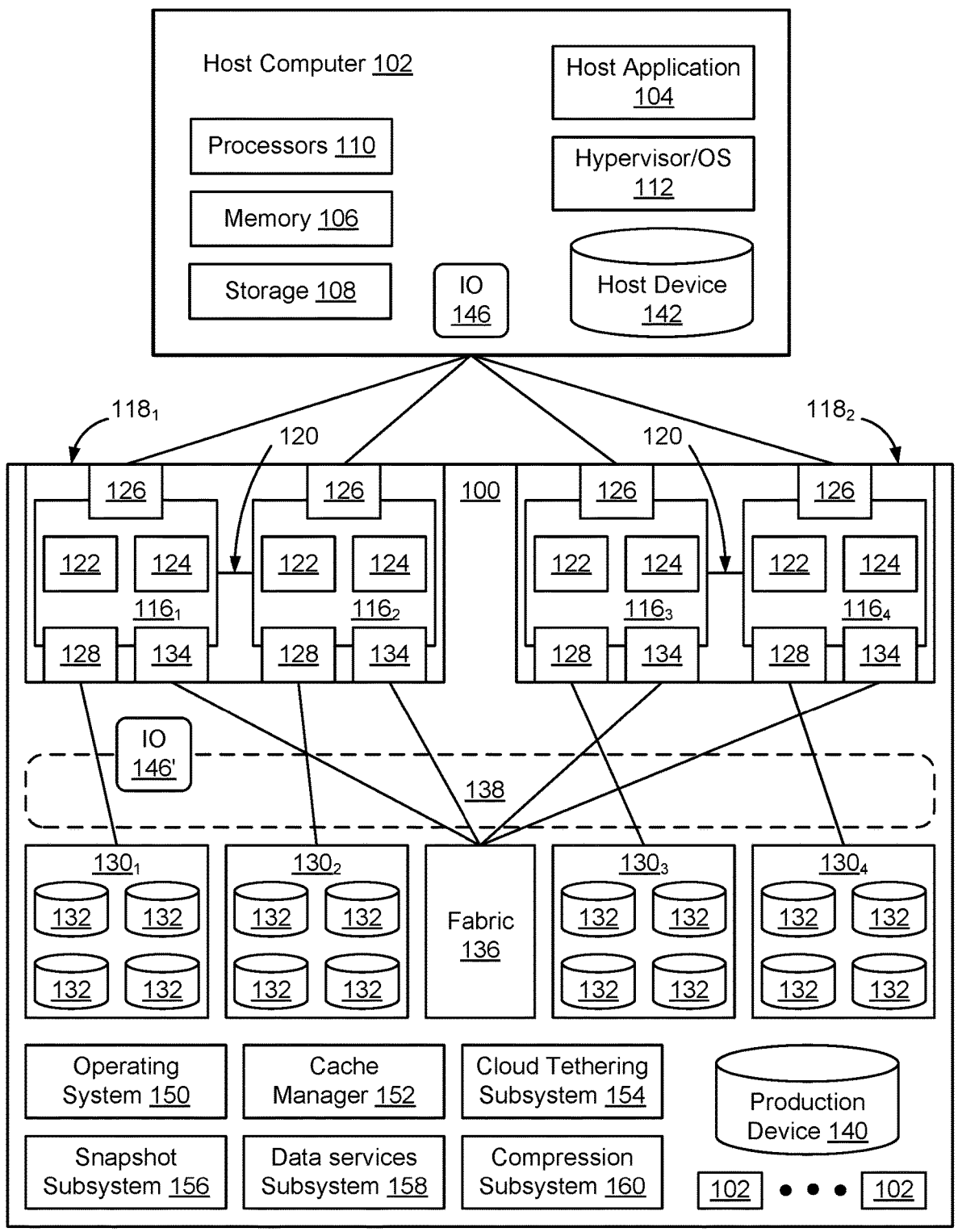
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

There may be multiple paths between the host computer 102 and the storage system 100, e.g. one path per front end adapter 126. The paths may be selected based on a wide variety of techniques and algorithms including, for context and without limitation, performance and load balancing. In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132. The virtual shared global memory 138 may enable the production device 140 to be reachable via all of the compute nodes $116_1$-$116_4$ and paths, although the storage system 100 can be configured to limit use of certain paths to certain production devices 140 (zoning).

Not all volumes of data on the storage system are accessible to host computer 104. When a volume of data is to be made available to the host computer, a logical storage volume, also referred to herein as a TDev (Thin Device), is linked to the volume of data, and presented to the host computer 104 as a host device 142. For example, to protect the production device against loss of data, a snapshot (point in time) copy of the production device may be created and maintained by the storage system. If the host needs to obtain access to the snapshot copy, for example for data recovery, the snapshot copy may be linked to a logical storage volume and presented to the host computer 104 as a host device 142 that the host computer 102 can use to access the data of the snapshot copy.

As shown in FIG. 1, in some embodiments the storage system 100 has an operating system 150, and one or more system applications, such as a cache manager, cloud tethering subsystem 154, snapshot subsystem 156, data services subsystem 158, and compression subsystem 160. In some embodiments, the system applications are implemented as applications executing within virtual machines on storage system 100.

One goal of the cache manager 152 is to attempt to place data into the cache (implemented as shared memory 138) that is likely to be required by one or more of the applications 104. By intelligently selecting data to be pre-fetched to the cache or to be retained in the cache 138, it is possible to increase the cache hit ratio. Because the storage system 100 can service an IO faster if the requested data is in the cache, increasing the cache hit ratio can thereby decrease overall latency of the storage system 100. Example adjustments to cache policies might include changing an amount of cache allocated to each application, adjusting how long data is retained in the cache, adjusting cache lookahead parameters, adjusting how much cache space is allocated to content that is requested once vs content that is requested two or more times, and other cache adjustments.

In some embodiments, the cache manager 152 executes intelligent algorithms designed to predict future IO operations on the storage system, to determine what data should be stored in the cache. Since the storage system is able to serve read IOs faster if the data is stored in the cache, correctly determining what data should be pre-loaded to the cache or retained in the cache can reduce the overall latency of the storage system. In some embodiments, the cache manager 152 uses data read IO operation and write IO operation patterns, in connection with the intelligent algorithms, to determine which data should be stored in the cache 138.

The cache manager 152 may implement multiple cache policies to try to optimize what data is stored in the cache. For example, one policy that the cache manager 152 may implement is a cache look-ahead policy. A cache look-ahead policy causes multiple consecutive blocks to be loaded to the cache each time a read IO or read IO pattern occurs on the storage system. For example, if a storage system is experiencing a high volume of consecutive data read operations, changing the cache look-ahead policy to increase the number of blocks that are pre-fetched to the cache may cause the cache hit ratio to increase. Likewise, if the storage system is experiencing a high volume of repeat read operations (reading the same data), increasing the proportion of the cache allocated to store repeatedly read data may increase the cache hit ratio.

Unfortunately, movement of snapshots by the cloud tethering subsystem involves long sequential read operations, which can skew the intelligent algorithms used by the cache manager 152, and reduce performance of the storage system. As discussed in greater detail herein, in some embodiments read operations by the cloud tethering subsystem 154 that are associated with movement of snapshots to the cloud repository 162 are not considered by the intelligent algorithms, to prevent read operations by the cloud tethering subsystem 154 from negatively affecting the ability of the cache manager 152 to accurately predict future IO operations on the storage system 100.

Compression subsystem 160, in some embodiments, is designed to reduce the amount of storage space required to store a given data volume, by running a compression algorithm on the data. Since decompression takes a finite amount of time, to minimize latency of the storage system, the compression subsystem 160 keeps at least a minimum amount of data, such as the most recent 20% of the data, in an uncompressed storage pool. Unfortunately, movement of data by the cloud tethering subsystem to cloud repository 162 can use a portion of the uncompressed storage pool, thus reducing the amount of space available for use by other active data. In some embodiments, the compression subsystem 160 does not include data associated with movement of snapshots by the cloud tethering subsystem in the uncompressed storage pool, to thereby free up room in the uncompressed storage pool for other more important data.

Snapshot subsystem 156, in some embodiments, is configured to create "snapshots" of a volume of data. A "snapshot," as that term is used herein, is a copy of a volume of data as that volume existed at a particular point in time. A snapshot of a production device 140, accordingly, is a copy of the data stored on the production device 140 as the data existed at the point in time when the snapshot was created. A snapshot can be either target-less (not linked to a thin device) or may be linked to a target thin device when created. When a snapshot of a production volume is created, the snapshot may include all of the data of the production volume, or only the changes to the production volume that have occurred since the previous snapshot was taken.

In some embodiments, a user will set policies on a group of LUNs referred to as a storage group. These policies define the frequency of the snapshot, the retention period of the snapshot, and the cloud provider where the object repository is to be hosted. The frequency tells the snapshot subsystem 156 in the storage array 130 to create a snapshot against all the LUNs in a storage group at a regular cadence, as defined by the user. The set of snapshots taken against a storage group are referred to as snapsets. The retention period defines the age of the snapshot when it should be deleted. The cloud provider tells the storage array the object repository where the snapshots need to be shipped.

The cloud tethering subsystem 154 is responsible for managing transmission of snapshots from the storage system 100 to an external cloud repository 162. For example, it may be desirable to move at least some of the snapshot copies from the storage system 100 to a cloud repository 162 to free up space in the back-end drive arrays 130, or for many other reasons. In some embodiments, the cloud tethering subsystem 154 is implemented as an application 104 executing in a container in an emulation on storage system 100. To access storage resources of the storage system 100, the cloud tethering subsystem 154 issues read and write IO operations 146, which are received by front end adapter 126 of the storage system, and processed by the front end adapter 126 in the same manner as other read/write operations.

According to some embodiments, the cloud tethering subsystem uses a set of thin devices that are tagged. The tag identifies the thin devices as being used by the cloud tethering subsystem to move snapshots to a cloud repository. After the snapshots are moved to the cloud repository, the snapshots are deleted on the storage system. Since the read operations associated with movement of snapshots to the cloud repository involve data that is being removed from the storage system, the data associated with the data read operations by the cloud tethering subsystem will not recur. By tagging the thin devices, the cache manager 152 and compression subsystem 160 can treat the read operations differently than other normal read operations. Specifically, when the cache manager detects that the read operation was on a tagged thin device, the cache manager does not use the read operation in connection with updating its intelligent algorithms. Similarly, when the compression subsystem detects that the read operation was on a tagged thin device, the compression subsystem does not include the data associated with the read operation in the uncompressed data pool.

Figure 2:
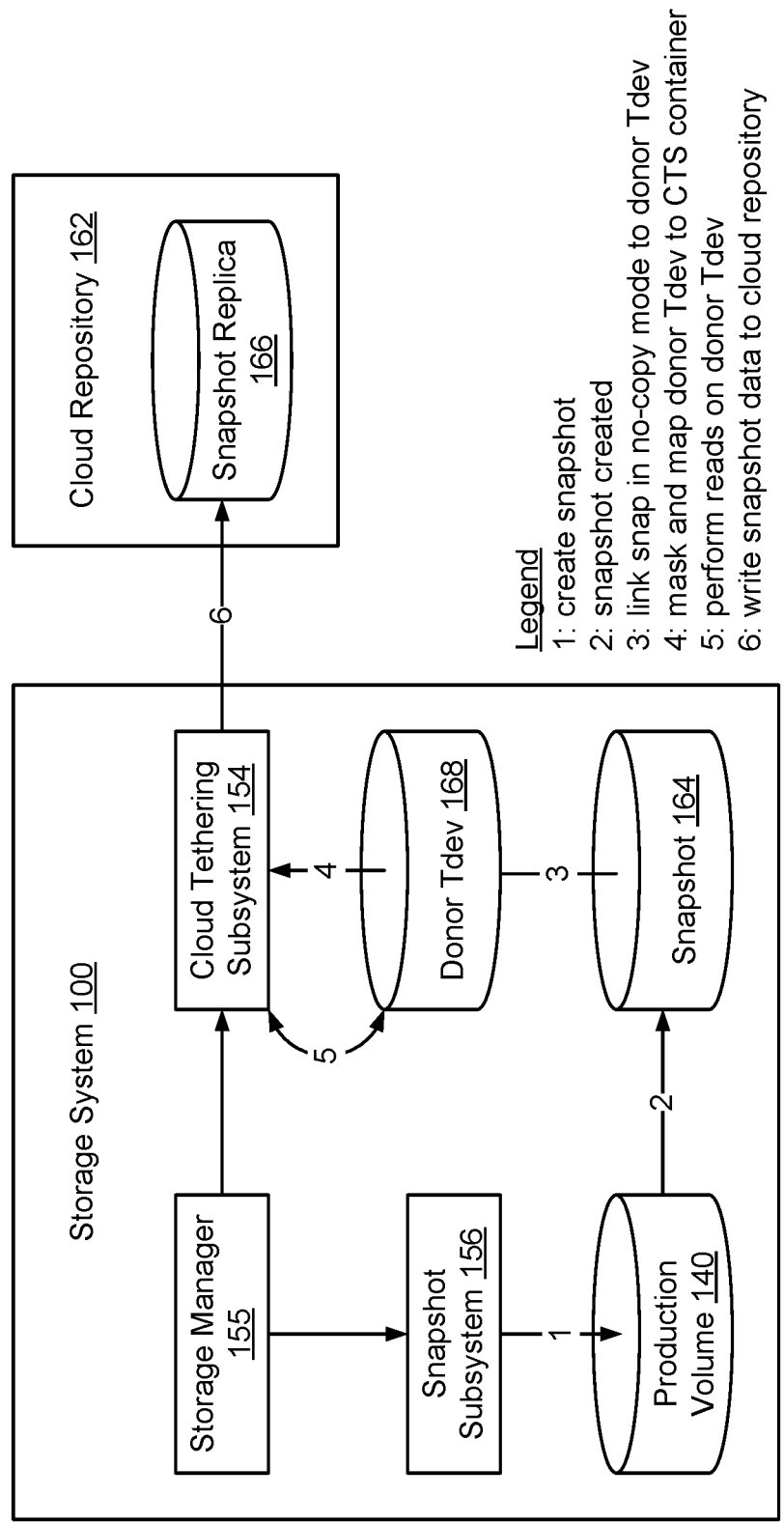
FIG. 2 is a functional block diagram of a storage system connected to a cloud repository, according to some embodiments.

FIG. 2 is a functional block diagram of a storage system 100 connected to a cloud repository 162, according to some embodiments. As shown in FIG. 2, in some embodiments the snapshot subsystem 156 periodically creates snapshot copies 164 of a production volume 140. If the cloud tethering subsystem 154 determines that the snapshot copy 164 should be moved from the storage system 100 to a cloud repository 162, a TDev (Thin Device) is linked to the snapshot copy and presented to the cloud tethering subsystem 154. The TDev that is linked to the snapshot copy for use by the cloud tethering subsystem will be referred herein as a "donor TDev" 168. The cloud tethering subsystem 154 executes read operations on the donor TDev 168 to access the data of the snapshot copy 164, and then transmits the data to the cloud repository 162. Once a snapshot replica 166 has been created in the cloud repository 162, the snapshot copy 164 on the storage system 100 can be erased.

If it is later necessary to retrieve the snapshot replica 166 from the cloud repository 162, the cloud tethering subsystem 154 is assigned a thin device to be used to store the snapshot 164. The cloud tethering subsystem then retrieves the snapshot replica 166 from the cloud repository 162, and executes write operations on the thin device 168 to cause the snapshot 164 to be restored to the storage system 100.

In some embodiments, the cloud tethering subsystem 154 implements a block LUN based snapshot shipping application, that ships sets of snapshots taken on a timeline to a heterogenous cloud repository 162 in object format. In some embodiments, the cloud tethering subsystem 154 is implemented as a Linux-based in-build container that is responsible for shipping the snapshots 164 to the cloud repository 162. The cloud snapshot shipping process generates cloud read traffic end to end within the storage system 100 where the cloud tethering subsystem 154 container is hosted, when the snapshot 164 is shipped to the cloud repository 162.

Once the snapshot is shipped, all traces of the snapshot 164 are removed from the embedded operating system 150 running on the storage system 100, although the cloud tethering subsystem 154 container continues to maintain a full catalogue of snapshots in the cloud repository 162. The user can see a full list of the snapshots in the cloud repository 162 via storage manager 155, and can use the storage manager 155 to instruct the cloud tethering subsystem 154 to recover the particular snapshots from the cloud repository 162 to the storage system 100. The recovery operation generates write IO traffic into the storage system 100.

The cloud tethering subsystem 154 is the primary data mover that is responsible for moving IO traffic between the back-end drive array 130 in the storage system 100 and the remote cloud repository 162. The storage system 100 has high value machine learning techniques used by the cache manager 152 to increase the cache read hits, which involves keeping the most active data uncompressed and ready in the cache 138. This is also referred to as activity-based compression for red hot data. In some embodiments, 20% of the red-hot data is always kept uncompressed in the cache 138. Unfortunately, shipment of the snapshot copies 164 from the storage system 100 to the cloud repository 162 by the cloud tethering subsystem 154 can create a skew in these red-hot data calculations. Specifically, when the cloud tethering subsystem 154 executes a large set of sequential read operations, these operations by the cloud tethering subsystem 154 can cause the cache manager 152 to determine that traffic on the cache is more sequential than it actually is. This can make it difficult for the cache manager 152 to accurately predict future IO operations on the storage system, which can result in a lower cache hit rate and, accordingly, increased storage system latency.

According to some embodiments, movement of data by the cloud tethering subsystem 154 between the storage system 100 and cloud repository 162 is treated different than other data access operations in the storage system 100, to thereby increase the accuracy of predicting future IO operations on the storage system 100. By making the storage system aware of IO operations associated with movement of data to the cloud repository 162, the storage system 100 can handle those conditions intelligently without impacting the overall system performance and in a fully automated way.

In some embodiments, read IO traffic by the cloud tethering subsystem 154 is not used by the cache manager 152 in connection with predicting future IO operations on the storage subsystem. Specifically, since the read IO operations by the cloud tethering subsystem 154 are associated with removing data (snapshot 164) from the storage system, those data associated with the read operations by the cloud tethering subsystem 154 will only occur once, and will not occur again after the snapshot has been moved to the cloud repository 162. Accordingly, the cache manager 152 should not use the data read operations by the cloud tethering subsystem 154 in connection with the intelligent algorithms. Likewise, the compression subsystem 160 should not keep any of the data associated with read operations by the cloud tethering subsystem 154 in uncompressed data pool. Cache write operations by the cloud tethering subsystem 154, however, involve movement of data back to the storage system 100 at the request of a user, and accordingly, that data is likely to be accessed at a future point in time. Accordingly, in some embodiments, cache write operations by the cloud tethering subsystem 154 are included in the intelligent algorithms implemented by the cache manager 152 to predict future IO operations on the storage system.

Figure 3:
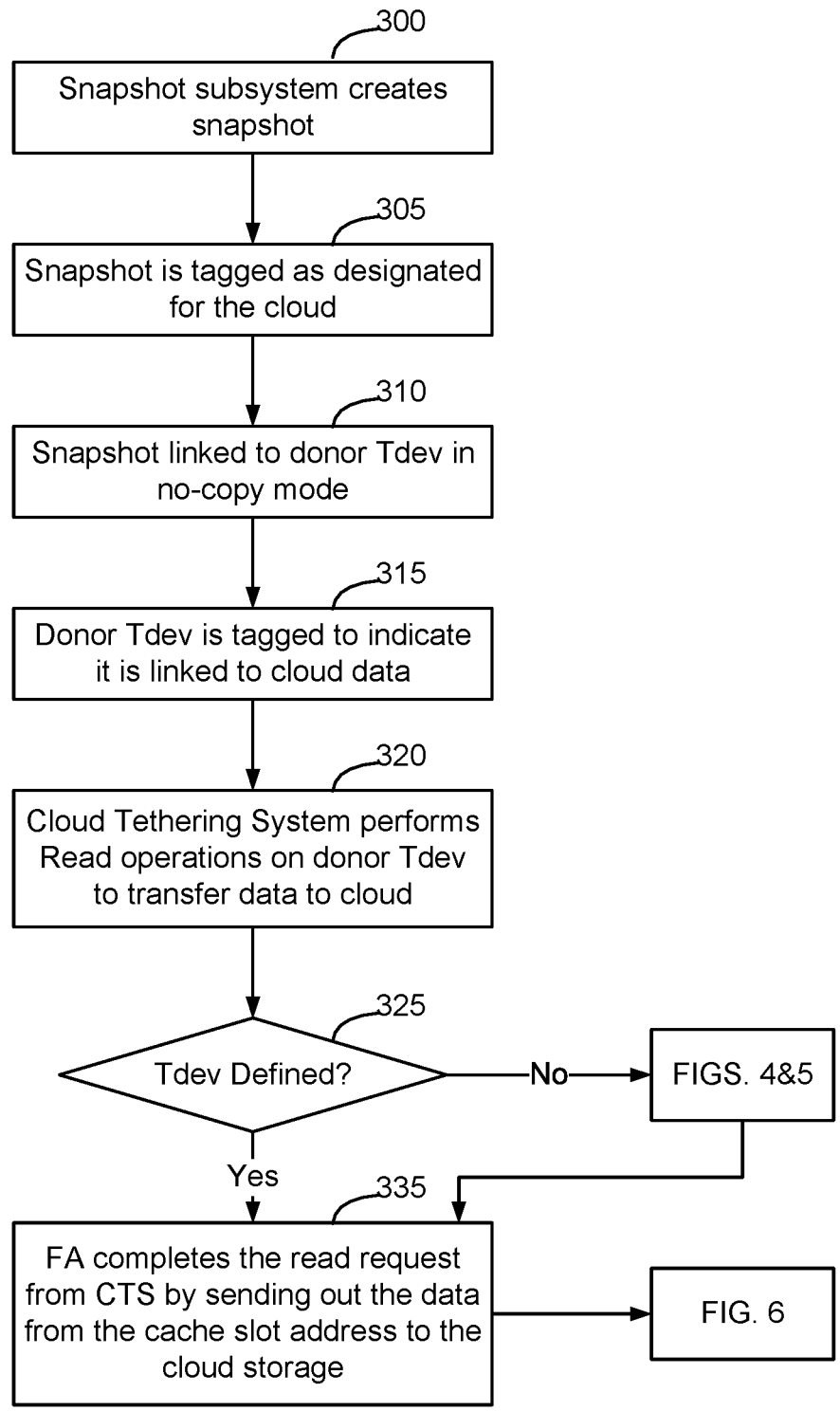
FIG. 3 is a flow chart of a method of increasing the accuracy of predicting future IO operations on a storage system, such as in the storage system of FIG. 1, in connection with movement of a snapshot to a cloud repository, according to some embodiments.

FIG. 3 is a flow chart of a method of increasing the accuracy of predicting future IO operations on a storage system, such as in the storage system of FIG. 1, in connection with movement of a snapshot to a cloud repository, according to some embodiments. The method may be implemented in connection with read operations associated with transmission of snapshots to a cloud repository, according to some embodiments. Although FIG. 3 will discuss movement of volumes of data by the cloud tethering subsystem 154 in connection with movement of snapshots 164 to a cloud repository, the cloud tethering subsystem 154 could also be used to move other volumes of data from the storage system 100 to the cloud repository 162 as well. Likewise, although some embodiments are discussed in connection with movement of data off the storage system 100 by cloud tethering subsystem 154, the method of FIG. 3 can be extended to movement of storage volumes by other system applications where the other system applications are removing the storage volumes from the storage system 100.

As shown in FIG. 3, in some embodiments the cloud tethering subsystem 154 is moving snapshots 164 that are created by the snapshot subsystem 156 (block 300). In some embodiments, some snapshots 164 are kept on the storage system 100, and some snapshots 164 are shipped by the cloud tethering subsystem 154 to the cloud repository 162. Those snapshots 164 that are to be moved to the cloud repository 162 are tagged as being designated to be moved to the cloud repository 162 (block 305). A tag such as "Cloud_Donor_Snap" may be used to designate a snapshot as being intended to be moved to the cloud repository 162. The snapshots 164 may be tagged as designated to be moved to the cloud repository 162 immediately upon creation by the snapshot subsystem 156, or may be tagged at some later point in time after creation of the snapshot 164.

In some embodiments, a designated set of TDevs (Thin Devices) are created for use by the cloud tethering subsystem 154 in connection with shipping data volumes to the cloud repository 162. These thin devices are tagged, for example, using a "CLOUD_DONOR_ACCESS_THIN_DEV" tag. As used herein, the term "donor TDev" will be used to refer to a thin device that has been tagged to identify it as being used by the cloud tethering subsystem 154 to move snapshots from the storage system 100 to the cloud repository 162.

When the cloud tethering subsystem 154 wants to ship the snapshot 164 to the cloud repository 162, it needs to access the snapshot 164. In some embodiments, the cloud tethering subsystem 154 sends a prepare call to the snapshot subsystem 156. As part of the prepare call, the cloud-tagged snapshot 164 is linked in nocopy mode to a donor TDev (block 310). In no-copy mode, the data of the snapshot is not actually copied to the donor TDev. The donor TDev is tagged to indicate that it is linked to cloud data (block 315). The donor TDev world-wide number (WWN) is also shared with the cloud tethering subsystem 154, and the donor TDev is masked and mapped to the container of the cloud tethering subsystem 154. With the WWN of the donor TDev, the cloud tethering subsystem 154 can issue read operations on the donor TDev to cause the data of the snapshot to be shipped to the cloud repository 162 (block 320).

The donor TDev may be defined or undefined. As used herein, the term "define" is used to refer to a process that changes the pointers of tracks of a target linked volume to share the same backend data as the source volume. When a target volume is linked, a define process scans the entire target device. The define process changes the pointers of each track on the target device to identify the appropriate backend data of the source volume.

Thus, if the donor TDev is defined, the define process is used to cause the tracks of the donor TDev to point to the backend tracks of the snapshot 164 before the cloud tethering subsystem 154 issues read operations on the donor TDev. If the donor TDev is undefined, by contrast, the define process is not used, and accordingly the tracks of the donor TDev do not point to the backend tracks of the snapshot 164 before the cloud tethering subsystem 154 issues read operations on the donor TDev.

The manner in which the storage system 100 handles read operations by the cloud tethering subsystem 154 will depend on whether the donor TDev is defined or undefined. Specifically, as shown in FIG. 3, in some embodiments, a determination is made as to whether the donor TDev is defined (block 325).

If the donor TDev is defined (a determination of YES at block 325), the cloud tethering subsystem 154 issues a read operation to the front-end adapter 126 for the data referenced in the defined track of the donor TDev (block 330). The front-end adapter moves the requested data to a selected cache slot in shared memory 138, and completes the read request by sending out the data from the cache slot address to the cloud repository 162 (block 335).

Figure 4:
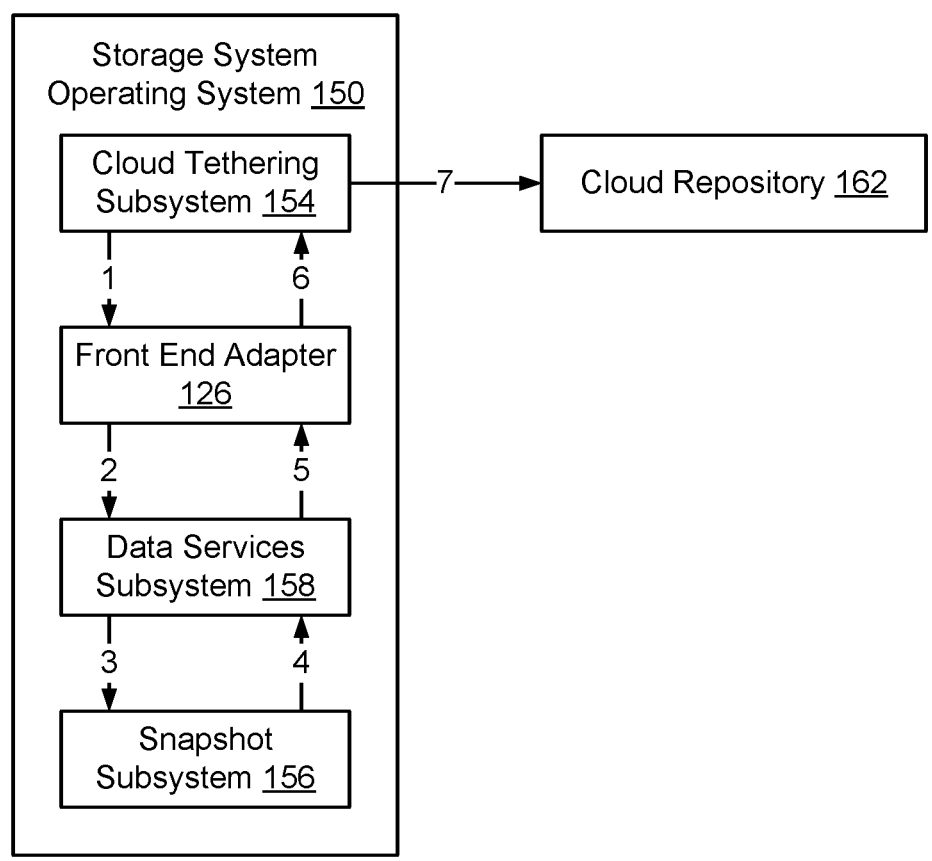
FIG. 4 is a functional block diagram illustrating execution of a read operation when a thin device used to move the snapshot is undefined, according to some embodiments.
Figure 5:
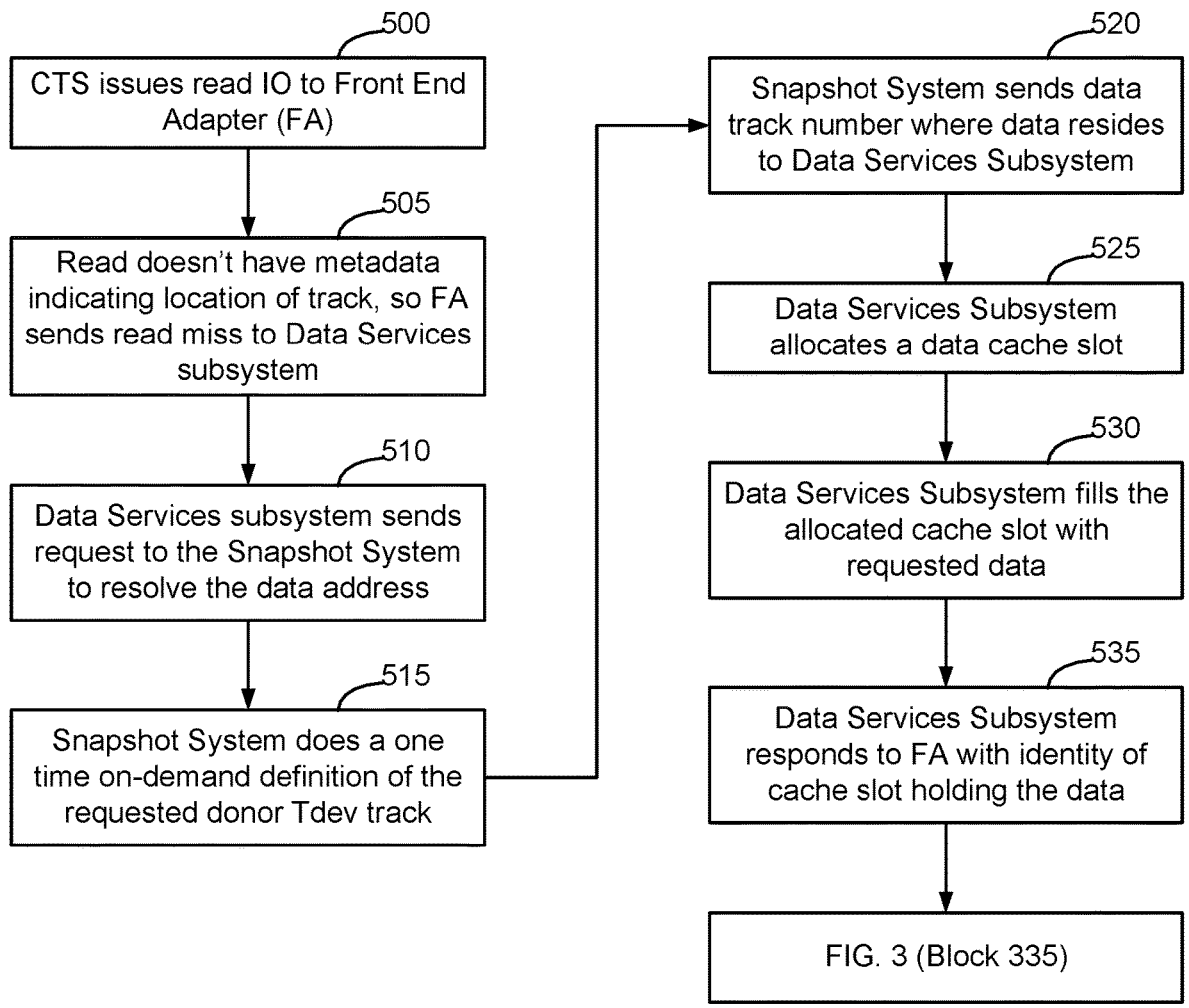
FIG. 5 is a flow chart of a method of implementing the read operations shown in FIG. 4 when the thin device used to move the snapshot is undefined, according to some embodiments.

If the donor TDev is not defined (a determination of NO at block 325), the storage system uses the process shown in FIGS. 4 and 5 to implement the read operations on the donor TDev.

FIG. 4 is a functional block diagram illustrating operation of the storage system 100, when the donor TDev 168 that is linked to the snapshot 164 is undefined, according to some embodiments. FIG. 5 is a flow chart of a method of implanting the read operations shown in FIG. 4 when the donor TDev 168 is undefined, according to some embodiments.

As shown in FIGS. 4 and 5, if the donor TDev is undefined, a read IO operation on a track of the donor TDev 168, issued by the cloud tethering subsystem 154 (FIG. 4, arrow 1; FIG. 5, block 500), will not contain metadata identifying the location of the requested snapshot data. Accordingly, when the front-end adapter 126 receives the read IO, the front-end adapter 126 sends a read miss to the data services subsystem 158 (FIG. 4, arrow 2; FIG. 5, block 505). The data services subsystem 158 sends the request to the snapshot subsystem 156 to ask the snapshot subsystem 156 to resolve the data address of the snapshot data (FIG. 4, arrow 3; FIG. 5, block 510). In response, the snapshot subsystem 156 does a one time on-demand definition of the requested donor TDev track (FIG. 5, block 515) to identify the location within managed drives 132 where the requested data is stored.

The snapshot subsystem 156 sends the data track number of one of the managed drives 132 where the data resides to the data services subsystem 158 (FIG. 4, arrow 4; FIG. 5, block 520). The data services subsystem 158 allocates a slot in cache 138 (FIG. 5, block 525), and the data services subsystem 158 fills the allocated cache slot with the data from the address provided at the previous step (FIG. 5, block 530). The data services subsystem 158 then responds to the front-end adapter 126 with the identity of the cache slot holding the data (FIG. 4, arrow 5; FIG. 5, block 535). The process then returns to FIG. 3, where the front-end adapter completes the read request from the cloud tethering subsystem 154 by sending out the data from the cache slot address to the cloud repository 162 (FIG. 3, block 335).

Figure 6:
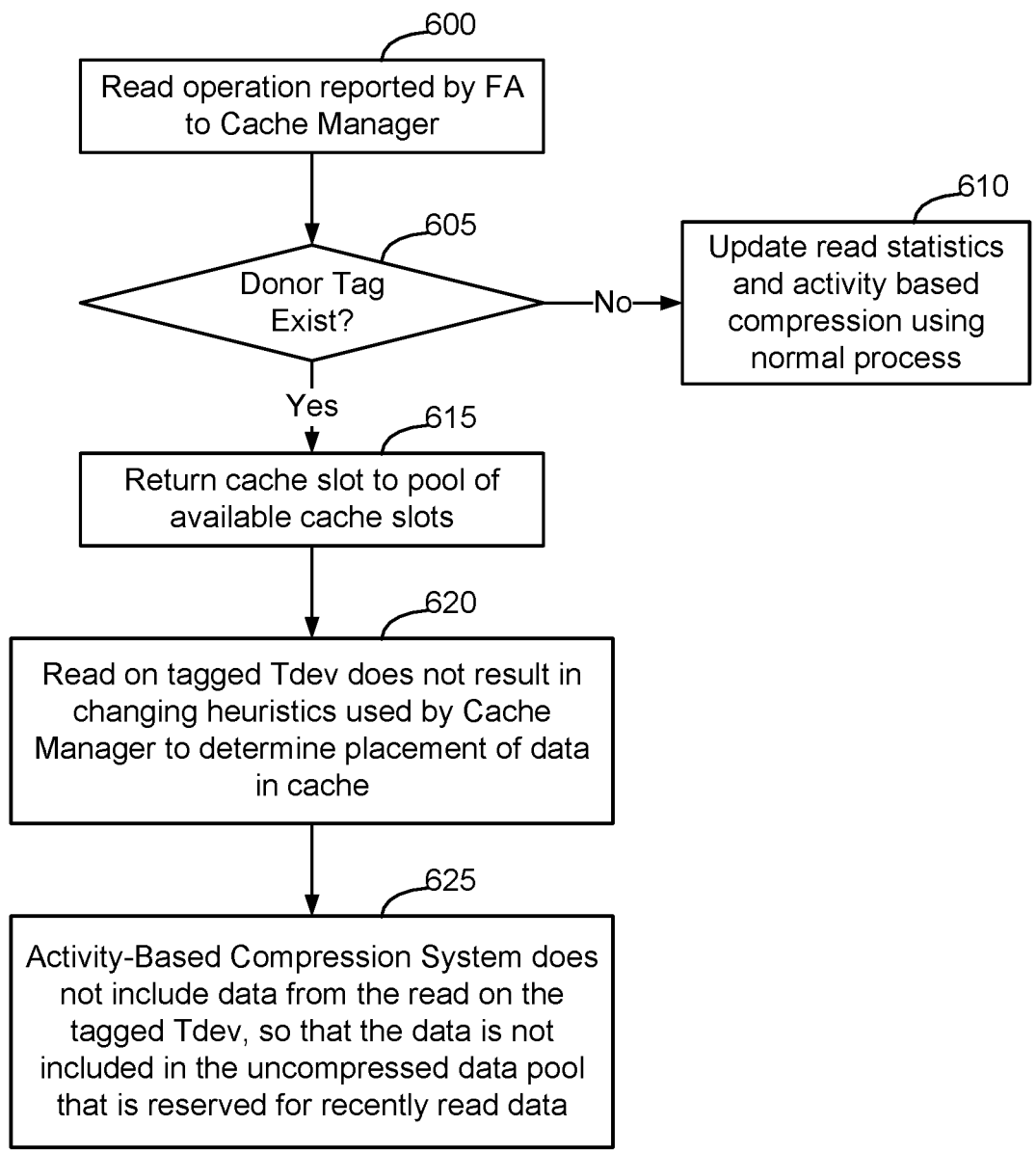
FIG. 6 is a flow chart of a method of updating the storage system operational statistics to increase the accuracy of predicting future IO operations in connection with read operations associated with movement of a snapshot to a cloud repository, according to some embodiments.

FIG. 6 is a flow chart of a method of updating the storage system operational statistics to increase the accuracy of predicting future IO operations in connection with read operations associated with movement of a snapshot to a cloud repository, according to some embodiments. As shown in FIG. 6, in some embodiments the cache manager 152 uses machine learning algorithms to collect read IO metrics and write IO metrics, and uses these statistics to predict future IO operations on the storage system. These algorithms attempt to keep data in cache that is likely to be requested again, and to pre-load data that is likely to be requested in the future, to increase the percentage of read operations that can be fulfilled from the cache 138. Increasing the percentage of read operations that can be fulfilled from the cache 138

(cache hit ratio), reduces the latency of the storage system 100, to thereby improve overall performance of the storage system.

In some embodiments, when a read operation occurs on the cache, and is reported by the front-end adapter 126 to the cache manager 152 (block 600), the cache manager 152 checks to determine if the read operation was from a tagged donor TDev 168 (block 605). In some embodiments, this determination is implemented by checking for the presence of the donor tag on the thin device associated with the read operation. If the thin device does not have a donor tag (a determination of NO at block 605) the read operation was not associated with movement of data to the cloud by the cloud tethering subsystem 154. Accordingly, the cache manager 152 uses the read IO operation to update its read IO operation metrics. Likewise, if the thin device is not tagged as a donor TDev, the compression subsystem 160 treats the read IO operation in a normal manner to selectively compress or not compress the data in a normal manner.

If the read operation was from a thin device that was tagged using the donor tag as a donor TDev (a determination of YES at block 605), the cache slot associated with the read operation is returned to the pool of available cache slots (block 615). This immediately makes the cache slot available for use with other IO operations on the cache 138 to increase the number of times a given cache slot can be reused during an operational period. Increasing the reuse frequency of cache slots makes it easier for other operations to be implemented on the cache, thus reducing cache contention within the storage system 100.

The read operation on the tagged donor TDev also does not result in changing the heuristics used by the cache manager 152 to determine placement of data in the cache (block 620). By ignoring the read operations associated with movement of data by the cloud tethering subsystem 154 from the storage array 130 to the cloud repository 162, it is possible to increase the accuracy of predicting future IO operations on the storage subsystem 100 by the cache manager 152. Specifically, the read operations by the cache tethering subsystem may have exhibit high sequentiality, which could skew the prediction algorithms used by cache manager 152 toward implementing cache policies optimized for highly sequential data access patterns. By ignoring the read operations by the cloud tethering subsystem 154, the cache manager 152 is able to base its cache management policies on the other traffic access patterns that are currently being experienced by the storage system 100. This enables the cache manager 152 to more accurately adjust the cache management policies, to optimize placement of data in the cache and thereby increase the overall cache hit ratio.

Similarly, the activity-based compression system 160 checks to determine if a read operation was on a tagged donor TDev. If the read IO was on a tagged donor TDev, the compression system 160 does not store the data associated with the read IO operation in the uncompressed data pool that is reserved for recently read data. By not including the data from the donor TDev in the uncompressed data pool, additional space is available in the uncompressed data pool for other data that might potentially be requested in future IO requests.

Figure 7:
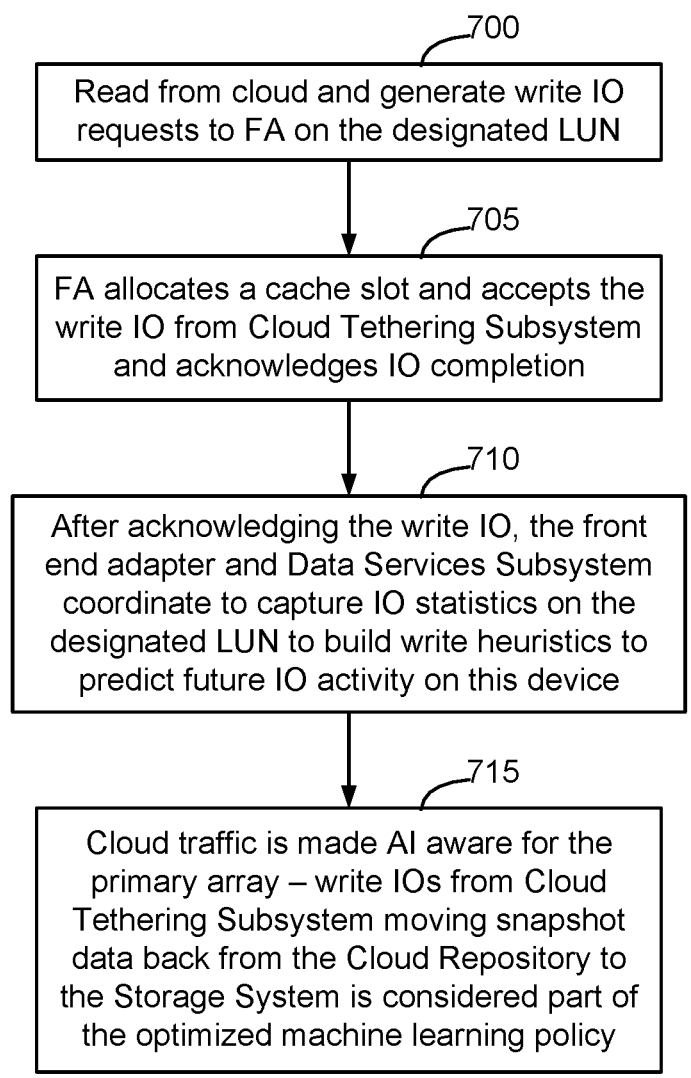
FIG. 7 is a flow chart of a method of updating storage system operational statistics in connection with write operations associated with restoring data from the cloud repository to the primary storage system, according to some embodiments.

FIG. 7 is a flow chart of a method of updating primary storage system operational metrics in connection with data write operations associated with bringing snapshot data from the cloud repository 162 to the storage system 100, according to some embodiments. Movement of a snapshot from the cloud repository 162 to the storage system 100 is typically done at the initiative of a user, because the user needs access to the data. Accordingly, when a snapshot is moved from the cloud repository 162 to the storage system 100, it is likely that at least some of the data will be accessed at some point.

As shown in FIG. 7, when the cloud tethering subsystem 154 brings a snapshot from the cloud repository 162 to the storage system 100, the cloud tethering subsystem 154 reads the requested data from the cloud and generates write IO requests to the front end adapter 126 on the designated thin device (LUN) that has been assigned to hold the snapshot (block 700). The front-end adapter 126 allocates a cache slot in cache 138 and accepts the write IO from the cloud tethering subsystem 154 (block 705). The data will subsequently be destaged to one or more of the managed drives 132 of storage array 130.

After acknowledging the write IO, the front-end adapter 126 and the data services subsystem 158 coordinate to capture IO statistics on the designated LUN to build write heuristics to predict future IO activity on this device (block 710). Example IO statistics that may be collected on the designated LUN may include IO age, IO timestamp, and the extent size of the IO, although other or additional statistics may be collected as well depending on the implementation.

Additionally, the cache manager 152 uses the write IOs from the cloud tethering subsystem 154 in connection with determining overall traffic patterns on the storage system 100 (block 715). Accordingly, the write IOs from the cloud tethering subsystem are considered part of the overall IO activity of the storage system 100, and are considered in connection with predicting future IO operations on the storage system.

Some embodiments have been described in connection with movement of snapshots of data by the cloud tethering subsystem to a cloud repository. Other instances where data is permanently being moved off the storage system, such as data migration, may also be implemented in a similar manner. Specifically, by using tagged donor TDevs and not using read operations on the tagged donor TDevs in connection with updating the intelligent algorithms used to implement cache management, it is possible to prevent movement of data off of the storage system from impacting the intelligent algorithms used to predict future IO operations on the storage system 100. Likewise, by not including data that is being moved off the storage system in the uncompressed data pool, it is possible to maintain a greater portion of active data in an uncompressed form on the storage system.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of increasing the accuracy of predicting future IO operations on a storage system, comprising the steps of:
    receiving first data read operations from host computers by a front-end adapter of the storage system;
    implementing the first data read operations by the front-end adapter, each respective first data read operation being implemented by the front-end adapter by locating data requested by the respective first data read operation in a shared cache or moving the data requested by the respective first data read operation from storage resources of the storage system to the shared cache, reading the respective requested data by the front-end adapter from the cache to the respective host computer, and reporting the cache read operation by the front-end adapter to a cache manager;
    creating a snapshot of a production volume on storage resources of the storage system;
    linking the snapshot to a thin device;
    mounting the thin device in a cloud tethering subsystem;
    tagging the thin device to identify the thin device as being used by the cloud tethering subsystem in connection with movement of the snapshot to a cloud repository;
    issuing second data read operations, by the cloud tethering subsystem, on the tagged thin device;
    executing the second data read operations by the front-end adapter of the storage system to forward data associated with the second data read operations to the cloud repository each second data read operation comprising locating the respective requested data in the shared cache or moving the respective requested data from the storage resources to the shared cache, reading the requested data by the front-end adapter from the cache, and reporting the cache read operation by the front-end adapter to the cache manager;
    determining cache read operation access patterns on the cache of the storage system by the cache manager from reported cache read operations from the front-end adapter associated with the first data read operations, the cache read operation access patterns being used by the cache manager to set cache policies governing management of the cache; and
    determining, by the cache manager, that the second data read operations were issued on the tagged thin device, and not using reported cache read operations on the cache associated with the second data read operations on the tagged thin device, by the cache manager, in connection with determining the cache read operation access patterns, so that movement of snapshots to the cloud repository do not affect setting of the cache policies governing the management of the cache.

2. The method of claim 1, further comprising not including, by a compression subsystem, the data associated with the second data read operations in an uncompressed data pool of the storage system.

3. The method of claim 2, further comprising a step of determining, by the compression subsystem, whether one of the second data read operations is on a tagged thin device prior to the step of not including the data associated with the second data read operations in the uncompressed data pool.

4. The method of claim 1, wherein the snapshot has data stored on backend allocations of tracks of memory, and wherein the thin device is defined such that tracks of the thin device contain pointers to the backend allocations of the tracks of memory of the snapshot.

5. The method of claim 1, wherein the snapshot has data stored on backend allocations of tracks of memory, and wherein the thin device is undefined such that tracks of the thin device do not contain pointers to the backend allocations of the tracks of memory of the snapshot.

6. The method of claim 5:
    wherein the step of executing the second data read operations by the front-end adapter of the storage system comprises issuing a respective request, for each second data read operation, to a data services subsystem to resolve the data address associated with the respective second data read operation.

7. The method of claim 6, further comprising sending, by the data services subsystem, a request to a snapshot subsystem for a one time on-demand definition of a requested track of the thin device associated with the respective second data read operation.

8. The method of claim 7, further comprising receiving, by the data services subsystem, a response from the snapshot subsystem, with a data track number where the requested data resides on the storage system.

9. The method of claim 8, further comprising allocating a slot in the cache, by the data services subsystem, and copying the requested data from the data track where the requested data resides on the storage system to the allocated slot in the cache.

10. The method of claim 9, further comprising forwarding, by the front-end adapter, the requested data from the allocated slot in the cache to the cloud repository.

11. The method of claim 1, further comprising issuing data write operations, by the cloud tethering subsystem, on a second thin device, the data write operations being associated with movement of a second snapshot from the cloud repository to the storage system.

12. The method of claim 11, further comprising using the data write operations, by the cache manager, in connection with determining write operation access patterns on the storage system, the write operation access patterns being used by the cache manager in connection with the read operation access patterns to set cache policies governing management of the cache.

13. The method of claim 11, further comprising including, by the compression subsystem, the data associated with the data write operations in an uncompressed data pool of the storage system.

* * * * *